(12) United States Patent
Hovanky et al.

(10) Patent No.: US 9,628,887 B2
(45) Date of Patent: Apr. 18, 2017

(54) TELECOMMUNICATIONS DEVICE

(71) Applicant: DOLBY LABORATORIES LICENSING CORPORATION, San Francisco, CA (US)

(72) Inventors: Thao D. Hovanky, San Francisco, CA (US); David Clementson, Palo Alto, CA (US); Venugopal Kalluri, San Ramon, CA (US); Erwin Goesnar, Daly City, CA (US); Gary Spittle, Hillsborough, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/430,694

(22) PCT Filed: Oct. 3, 2013

(86) PCT No.: PCT/US2013/063225
§ 371 (c)(1),
(2) Date: Mar. 24, 2015

(87) PCT Pub. No.: WO2014/062389
PCT Pub. Date: Apr. 24, 2014

(65) Prior Publication Data
US 2015/0264461 A1 Sep. 17, 2015

Related U.S. Application Data

(60) Provisional application No. 61/713,768, filed on Oct. 15, 2012.

(51) Int. Cl.
*H04R 1/02* (2006.01)
*H04R 1/08* (2006.01)
(Continued)

(52) U.S. Cl.
CPC .............. *H04R 1/08* (2013.01); *H04M 3/56* (2013.01); *H04R 27/00* (2013.01); *H04R 29/007* (2013.01); *H04R 1/403* (2013.01); *H04R 1/406* (2013.01)

(58) Field of Classification Search
CPC ......... H04M 3/56; H04R 1/403; H04R 1/406; H04R 1/08; H04R 29/007; H04R 3/005; H04R 27/00
See application file for complete search history.

(56) References Cited

U.S. PATENT DOCUMENTS 4,184,048 A 1/1980 Alcaide
8,842,152 B2 * 9/2014 Couse .................... H04N 7/147
348/14.01
(Continued)

*Primary Examiner* — Regina N Holder

(57) ABSTRACT

A telecommunications device (1) comprises a base part (2), a cap part (4), a body part (3), a control panel (5), an upper light ring (9), a lower light ring (8), a plurality of sound microphones and a plurality of sound speakers. The cap part (4) is concave in shape. The body part (3) is frusto-conical in shape and tapers outwardly away from the cap part (4) towards the base part (2). The body part (3) and the cap part (4) cover the sound microphones and the sound speakers. The control panel (5) is inclined relative to the plane of the support surface (6) and relative to the plane of the base part (2). The control panel (5) protrudes upwardly from the upper edge of the body part (3) over the concave cap part (4), and the control panel (5) protrudes downwardly from the lower edge of the body part (3). The control panel (5) controls operation of the sound microphones and the sound speakers. The upper light ring (9) is located between the cap part (4) and the body part (3). The lower light ring (8) is located between the body part (3) and the base part (2). When the device (1) is in an active state in which the device (1) is capable of capturing sound and/or rendering sound, each of the light rings (8, 9) emits light to indicate the active state of the device (1).

17 Claims, 15 Drawing Sheets

(51) Int. Cl.
   *H04M 3/56*   (2006.01)
   *H04R 27/00*   (2006.01)
   *H04R 29/00*   (2006.01)
   *H04R 1/40*   (2006.01)

(56) References Cited

U.S. PATENT DOCUMENTS

| | | | |
|---|---|---|---|
| 2007/0111749 A1* | 5/2007 | Biddulph | H01Q 1/38 |
| | | | 455/550.1 |
| 2009/0214016 A1* | 8/2009 | O'Sullivan | H04M 3/56 |
| | | | 379/202.01 |
| 2010/0002899 A1 | 1/2010 | Tamaru | |
| 2013/0100233 A1* | 4/2013 | Turqueti | H04R 1/326 |
| | | | 348/14.02 |

* cited by examiner

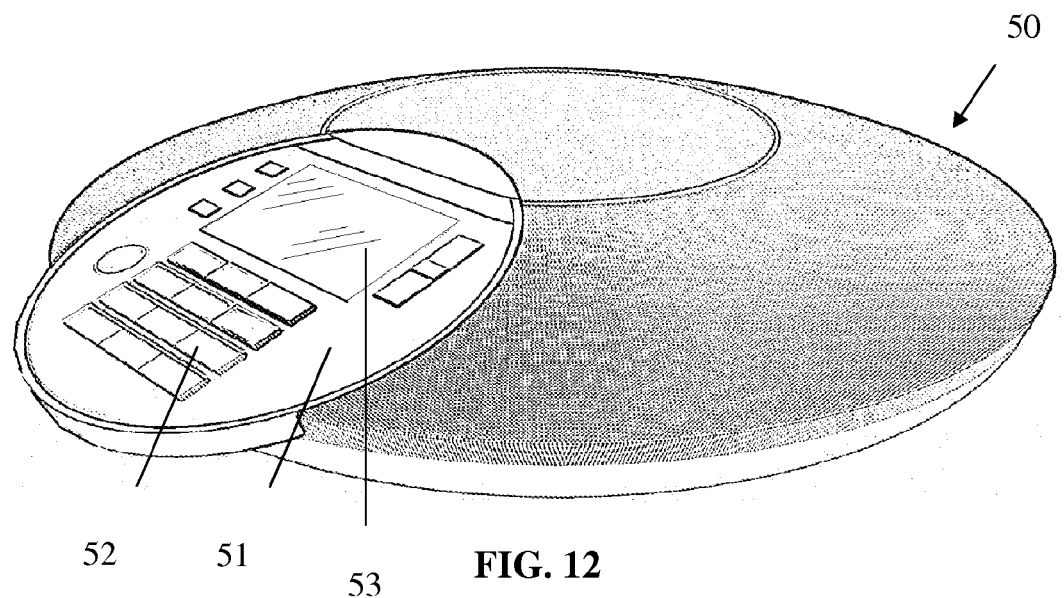
52  51  53  FIG. 12
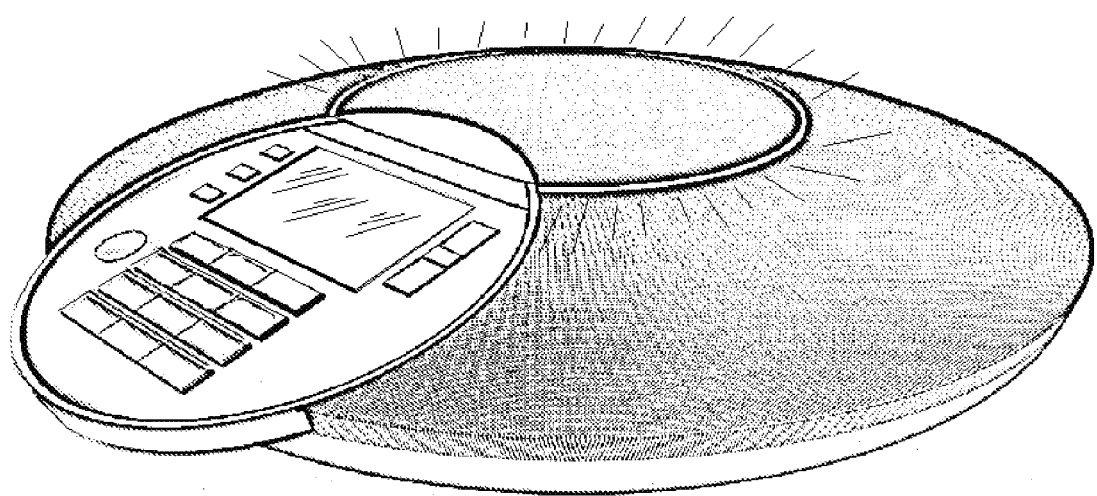
FIG. 13

TELECOMMUNICATIONS DEVICE

CROSS-REFERENCE TO RELATED APPLICATIONS

This application claims priority to U.S. Provisional Patent Application No. 61/713,768 filed 15 Oct. 2012, which is hereby incorporated by reference in its entirety.

INTRODUCTION

This invention relates to a telecommunications device.

STATEMENTS OF INVENTION

According to the invention there is provided a telecommunications device comprising:
means to capture sound from one or more users, and
means to render sound to one or more users.

In one embodiment of the invention the capturing means is configured to capture sound from one or more users spaced apart from the capturing means. The users are not required to use handsets and may be positioned comfortably around a table or a meeting room or the like. Preferably the capturing means is configured to capture sound from one or more users spaced apart from the capturing means by at least 0.25 m. Ideally the capturing means is configured to capture sound from one or more users spaced apart from the capturing means by at least 0.5 m. Most preferably the capturing means is configured to capture sound from one or more users spaced apart from the capturing means by at least 1 m.

In another embodiment the capturing means comprises a plurality of sound capturing elements. In this manner the invention may capture the authentic soundfield from multiple users in a meeting environment. Preferably the angle of sound capture of a first sound capturing element is inclined relative to the angle of sound capture of a second sound capturing element. Ideally the angle subtended between the angle of sound capture of the first sound capturing element and the angle of sound capture of the second sound capturing element is greater than 60 degrees. Most preferably the angle subtended between the angle of sound capture of the first sound capturing element and the angle of sound capture of the second sound capturing element is greater than 90 degrees. The angle subtended between the angle of sound capture of the first sound capturing element and the angle of sound capture of the second sound capturing element may be approximately 120 degrees. Preferably the capturing means comprises one or more sound microphones.

In one case the rendering means is configured to render sound to one or more users spaced apart from the rendering means. The users are not required to use handsets and may be positioned comfortably around a table or a meeting room or the like. Preferably the rendering means is configured to render sound to one or more users spaced apart from the rendering means by at least 0.25 m. Ideally the rendering means is configured to render sound to one or more users spaced apart from the rendering means by at least 0.5 m. Most preferably the rendering means is configured to render sound to one or more users spaced apart from the rendering means by at least 1 m.

In another case the rendering means comprises a plurality of sound rendering elements. In this manner the invention may render an authentic soundfield to multiple users in a meeting environment. Preferably the angle of sound render of a first sound rendering element is inclined relative to the angle of sound render of a second sound rendering element. Ideally the angle subtended between the angle of sound render of the first sound rendering element and the angle of sound render of the second sound rendering element is greater than 60 degrees. Most preferably the angle subtended between the angle of sound render of the first sound rendering element and the angle of sound render of the second sound rendering element is greater than 90 degrees. The angle subtended between the angle of sound render of the first sound rendering element and the angle of sound render of the second sound rendering element may be approximately 120 degrees. Preferably the rendering means comprises one or more sound speakers.

In one embodiment the device comprises means to cover at least part of the capturing means and/or at least part of the rendering means. In this manner users are discouraged from positioning themselves relative to the capturing means and/or the rendering means to ensure a more natural meeting environment. Preferably the cover means is configured to facilitate sound transmission therethrough. Ideally the cover means comprises a plurality of apertures.

In another embodiment the device comprises a base part for resting on a support surface. Preferably the device comprises a cap part for location spaced apart from a support surface. Ideally the cap part is configured to face away from a support surface. The cap part may be concave in shape. The cap part may be convex in shape. Most preferably the device comprises a body part extending from the cap part to the base part. The body part may taper outwardly away from the cap part. Preferably the body part is frusto-conical in shape.

In one case the device comprises means to control operation of the capturing means and/or of the rendering means. Preferably the control means is inclined relative to the plane of a support surface. Ideally the control means is inclined relative to the plane of the base part. This arrangement enables ease of use of the device. Most preferably the angle of inclination is greater than 10 degrees. The angle of inclination may be greater than 20 degrees. Preferably the angle of inclination is less than 60 degrees. Ideally the angle of inclination is less than 45 degrees. Most preferably the angle of inclination is approximately 30 degrees. The control means may be configured to control operation responsive to a user touching at least part of the control means. Preferably the control means comprises at least one touchscreen element. The control means may be configured to control operation responsive to a user engaging at least part of the control means to depress at least part of the control means. Preferably the control means comprises at least one button element. The control means may comprise means to display information to a user. Preferably the display means comprises a screen element. The control means may be movable relative to the body part. In this manner users are not required to move relative to the device in the event of different users wishing to control the device to ensure a more natural meeting environment. Preferably the control means is slidable over at least part of the body part.

In another case the device comprises an active state in which the device is capable of capturing sound and/or rendering sound. Preferably the device comprises an inactive state in which the device is incapable of capturing sound and/or rendering sound. Ideally the device comprises means to indicate the state of the device. Most preferably the indication means comprises means to emit energy. The indication means may comprise means to emit light. At least part of the indication means may extend along at least part of the external surface of the device. Preferably the indication means extends in a curved shape. Ideally the indication means extends in a plane substantially parallel to the plane of a support surface. Most preferably the indication means extends in a plane substantially parallel to the plane of the base part. The indication means may comprise a tubular element. At least part of the indication means may be located between the cap part and the body part. At least part of the indication means may be located between the body part and the base part. At least part of the indication means may extend around at least part of the control means.

BRIEF DESCRIPTION OF THE DRAWINGS

The invention will be more clearly understood from the following description of some embodiments thereof, given by way of example only, with reference to the accompanying drawings, in which:

FIG. 12 is an isometric view of another telecommunications device according to the invention in an inactive state, FIG. 13 is an isometric view of the telecommunications device of FIG. 12 in an active state.

DETAILED DESCRIPTION

Figure 1:
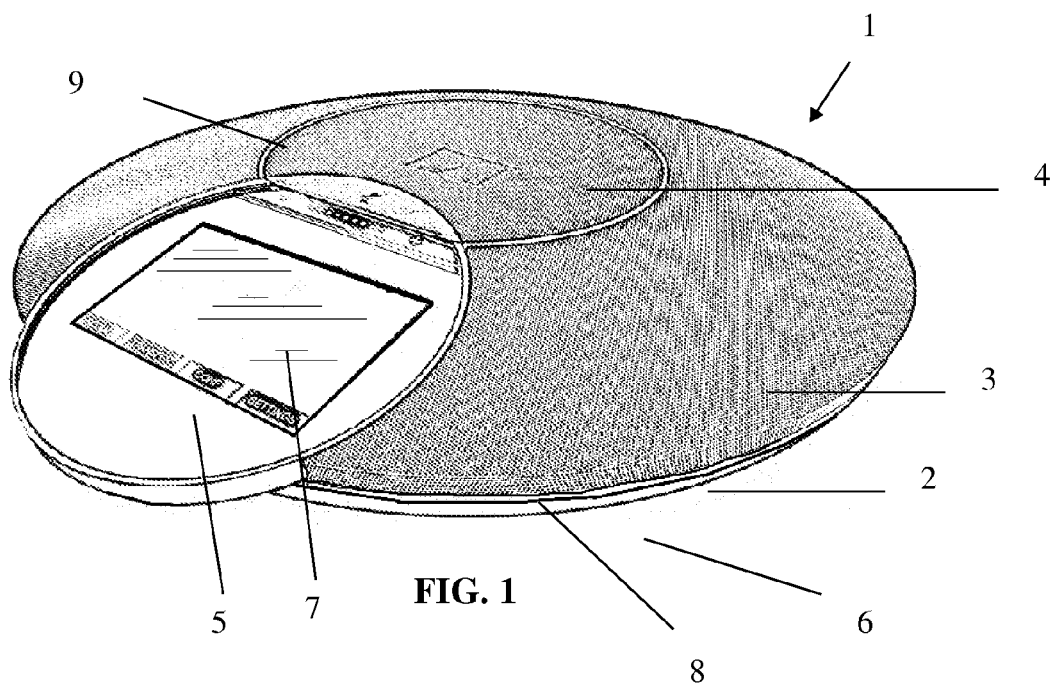
FIG. 1 is an isometric view of a telecommunications device according to the invention in an inactive state.

Referring to the drawings, and initially to FIGS. 1 to 7 thereof, there is illustrated a telecommunications device 1 according to the invention.

The device 1 comprises a base part 2, a cap part 4, a body part 3, a control panel 5, an upper light ring 9, a lower light ring 8, a plurality of sound microphones and a plurality of sound speakers.

The sound microphones are employed to capture sound from one or more users spaced apart from the device 1, for example spaced apart from the device 1 by at least 0.25 m, preferably spaced apart from the device 1 by at least 0.5 m. In this case the sound microphones capture sound from one or more users spaced apart from the device 1 by at least 1 m.

The angle of sound capture of each sound microphone is inclined relative to the angle of sound capture of each adjacent sound microphone. The angle subtended between the angle of sound capture of one sound microphone and the angle of sound capture of the adjacent sound microphone may be greater than 60 degrees, preferably the angle subtended is greater than 90 degrees. In this case the angle subtended is approximately 120 degrees.

The sound speakers are employed to render sound to one or more users spaced apart from the device 1, for example spaced apart from the device 1 by at least 0.25 m, preferably spaced apart from the device 1 by at least 0.5 m. In this case the sound speakers are employed to render sound to one or more users spaced apart from the device 1 by at least 1 m.

The angle of sound render of each sound speaker is inclined relative to the angle of sound render of each adjacent sound speaker. The angle subtended between the angle of sound render of one sound speaker and the angle of sound render of the adjacent sound speaker may be greater than 60 degrees, preferably the angle subtended is greater than 90 degrees. In this case the angle subtended is approximately 120 degrees.

The angles of the loudspeakers for spatial rendering may be 15 degrees. This arrangement provides less reflections of surfaces. This arrangement results in better spatial envelopment without the speakers facing each listener in the room. This arrangement also results in better coverage of sound from the device with a more uniform radiation at a typical listening distance from the device, such as 50 cm and further.

Figure 27:
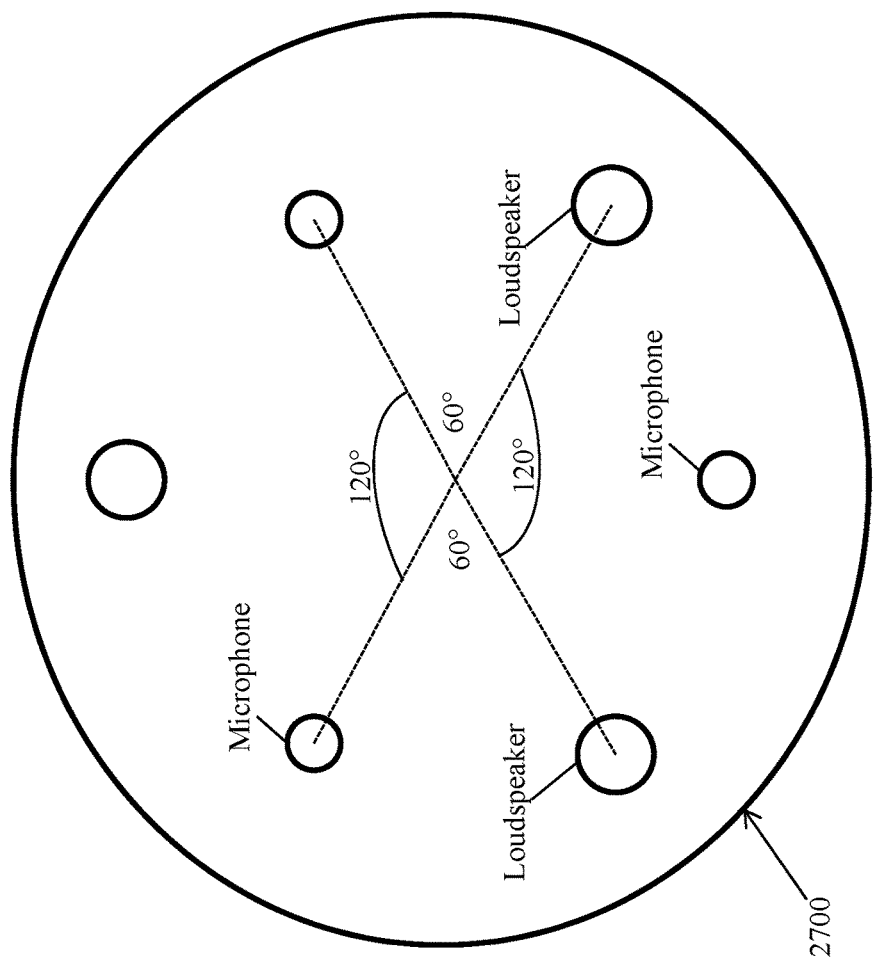
FIG. 27 is a top view of one simplified example of a telecommunications device.

The microphone orientation may be offset from the loudspeakers, for example 120 degrees between each loudspeaker and 120 degrees between microphones as shown in the example of the telecommunications device 2700 of FIG. 27. Each may be offset to achieve 60 degrees between each microphone and speaker, as shown in FIG. 27. This arrangement may help with echo.

The base part 2 is suitable for resting on a support surface 6 such as a meeting room table.

The cap part 4 is located spaced apart from the support surface 6. The cap part 4 is concave in shape. As illustrated in FIG. 1, the cap part 4 faces upwardly away from the support surface 6.

The body part 3 extends from the cap part 4 to the base part 2. As illustrated in FIG. 1, the body part 3 is frustoconical in shape and tapers outwardly away from the cap part 4 towards the base part 2.

The body part 3 and the cap part 4 cover the sound microphones and the sound speakers to ensure that the sound microphones and the sound speakers are not visible to a user. The body part 3 and the cap part 4 comprise a plurality of apertures extending therethrough to facilitate sound transmission therethrough. The body part 3 and the cap part 4 may be of any suitable material, for example of metal.

The mesh cover 3, 4 hides the visual cue of where the speakers are in the circle design. This arrangement removes the visual cue of where the sound comes from each of the loudspeakers and uses the acoustic cues instead. Thus listeners experience the sound to radiate uniformly from the device 1.

The material covering the device may be perforated metal or an actual metal or wire mesh. These alternative materials may provide different light reflections when on a conference table. These alternative materials may provide different weight to the device and cost of manufacture.

Figure 6:
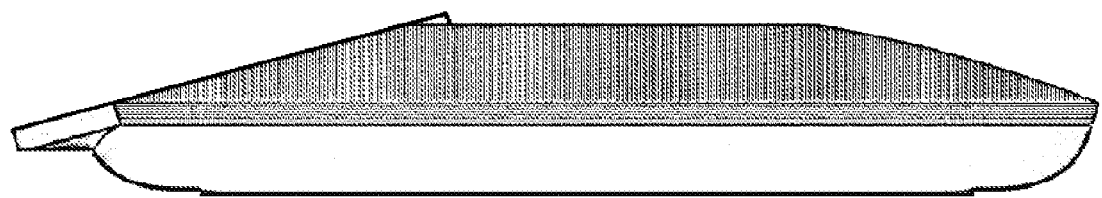
FIG. 6 is a side view of the telecommunications device of FIG. 1 in the inactive state.

As illustrated in FIG. 6, the control panel 5 is inclined relative to the plane of the support surface 6 and relative to the plane of the base part 2. The angle of inclination may be greater than 10 degrees, preferably the angle of inclination is greater than 20 degrees. The angle of inclination may be less than 60 degrees, preferably the angle of inclination is less than 45 degrees. In this case the angle of inclination is approximately 30 degrees.

As illustrated in FIG. 6, the control panel 5 protrudes upwardly from the upper edge of the body part 3 over the concave cap part 4, and the control panel 5 protrudes downwardly from the lower edge of the body part 3.

The control panel 5 controls operation of the sound microphones and the sound speakers. The control panel 5 comprises a touchscreen element 7 to control operation responsive to a user touching part of the touchscreen element 7. The touchscreen element 7 displays information to a user.

The control panel 5 is positioned centrally on the angled panel 3 around the device 1.

The metal of the control panel 5 provides EMI shielding between the keypad/screen 7 and the speakers and the PCB underneath the control panel 5.

The touchscreen 7 may be used with finger swipes for volume, spatial rotation and the like.

A mute control may be provided on the top of the control panel 5 accessible from all sides by all users with a mute indication visible from all sides. The mute indication may be elevated above the main view line of the device 1.

The control panel 5 may include a screen saver, for example to show internal corporate advertisements and messages on a device when not in a call.

The control panel 5 may include capacitive touch and presence detection when a user is close to the device 1 to turn the device 1 on and take it out of standby mode. A user may touch anywhere on the device 1 not just the screen. A user may touch on the mesh 3. This may be used to control the device 1 as well, for example to activate a mute function. A touch on the outer panel 3 may be used to indicate the position of the talker relative to the device 1. This may inform the audio rendering engine of the physical location of the talkers without having to estimate it when they talk. The audio scene may be rendered for the users in that location. Dragging a finger around the outer panel 3 on the device may rotate the audio scene.

The upper light ring 9 is located between the cap part 4 and the body part 3. The lower light ring 8 is located between the body part 3 and the base part 2. Each of the light rings 8, 9 extends along part of the external surface of the device 1 in a curved ring shape. Each of the light rings 8, 9 extends in a plane parallel to the plane of a support surface 6 and parallel to the plane of the base part 2. Each of the light rings 8, 9 comprises a tubular element.

When the device 1 is in an active state in which the device 1 is capable of capturing sound and/or rendering sound, each of the light rings 8, 9 emits light to indicate the active state of the device 1. When the device 1 is in an inactive state in which the device 1 is incapable of capturing sound and/or rendering sound, each of the light rings 8, 9 is turned off and does not emit light to indicate the inactive state of the device 1.

Figure 2:
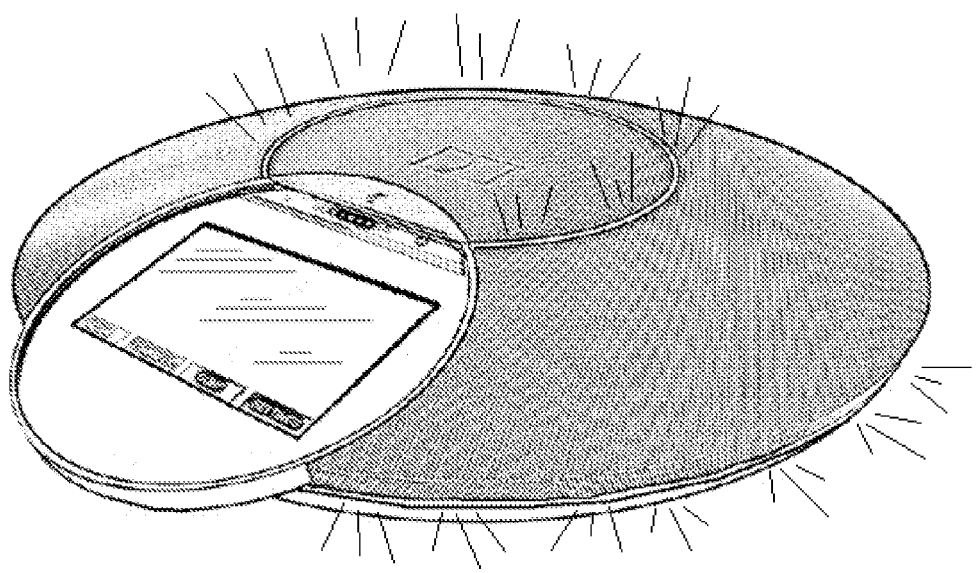
FIG. 2 is an isometric view of the telecommunications device of FIG. 1 in an active state.
Figure 3:
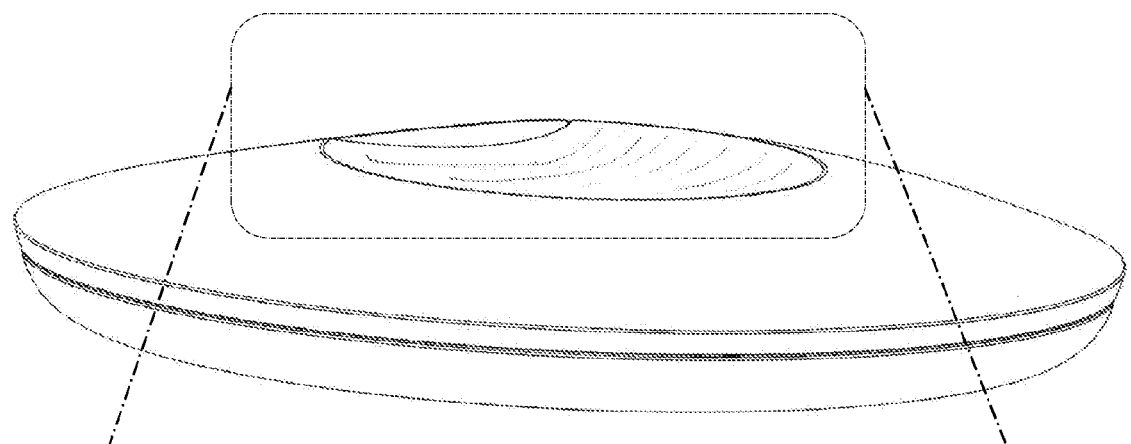
FIG. 3 is an isometric view of the telecommunications device of FIG. 1 in the inactive state from the rear.
Figure 4:
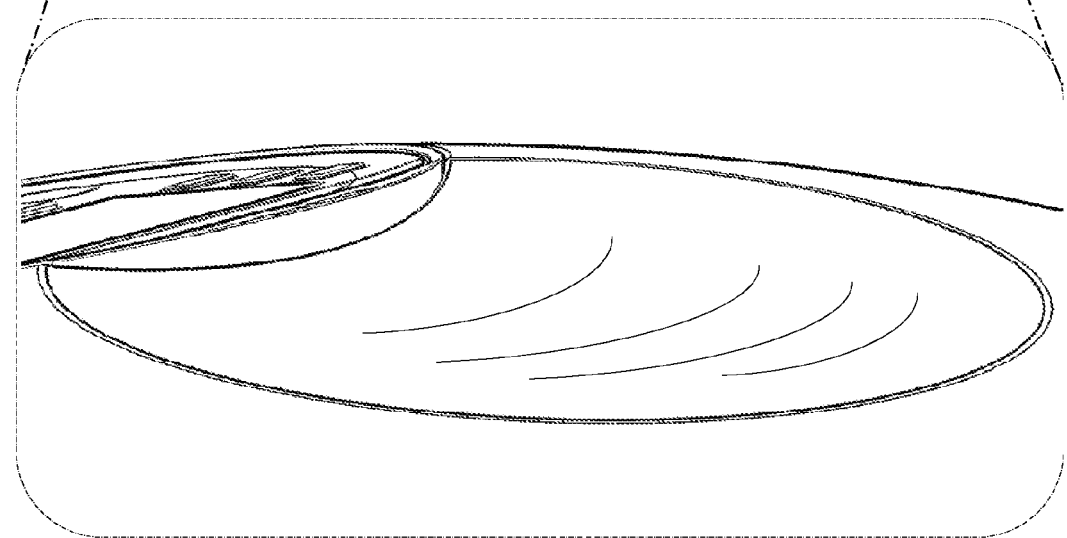
FIG. 4 is an enlarged isometric view of the telecommunications device of FIG. 3 in the inactive state from the rear.
Figure 5:
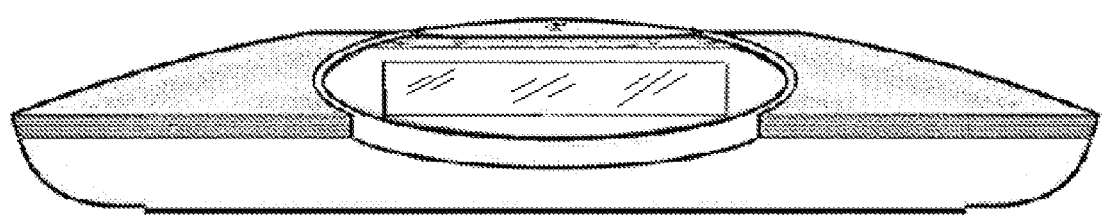
FIG. 5 is a front view of the telecommunications device of FIG. 1 in the inactive state.
Figure 7:
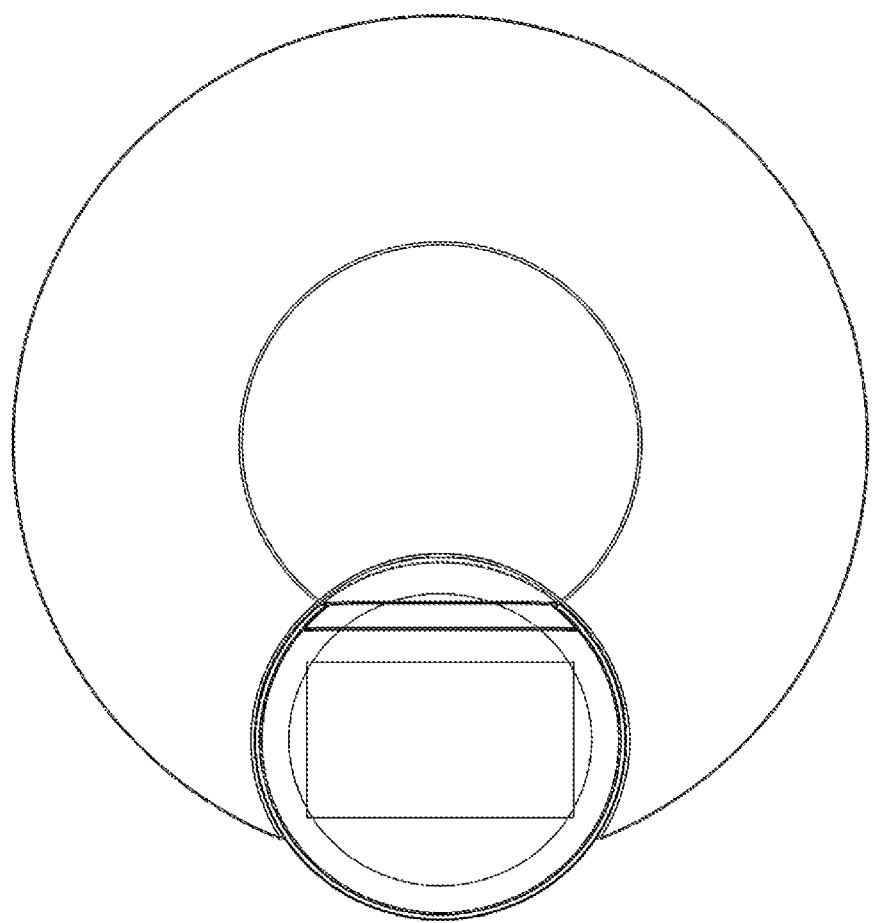
FIG. 7 is a plan view of the telecommunications device of FIG. 1 in the inactive state.

FIG. 1 illustrates the telecommunications device 1 having the touch screen 7 with the top and bottom mounted light rings 8, 9 turned off. FIG. 2 illustrates the telecommunications device 1 having the touch screen 7 with the top and bottom mounted light rings 8, 9 activated. FIG. 3 illustrates the telecommunications device 1 having the dish concave top 4 with the exposed portion of the control panel 5. FIG. 4 illustrates the telecommunications device 1 having the dish concave top 4 with the exposed portion of the control panel 5. FIG. 5 illustrates the telecommunications device 1 having the dish top 4 and the touch screen 7. FIG. 6 illustrates the telecommunications device 1 having the dish top 4 and the touch screen 7. FIG. 7 illustrates the telecommunications device 1 having the flat top with the touch screen 7 with the light ring 9 on top.

In use, the base part 2 rests on the support surface 6 such as a meeting room table. When a user wishes to operate the device 1, the user controls operation of the sound microphones and of the sound speakers using the control panel 5. When the device 1 is in an active state in which the device 1 is capable of capturing sound and/or rendering sound, each of the light rings 8, 9 emits light to indicate the active state of the device 1.

The sound microphones capture sound from one or more users spaced apart from the device 1, and the sound speakers render sound to the one or more users spaced apart from the device 1. The touchscreen element 7 displays information to a user.

When a user wishes to cease operating the device 1, the user uses the control panel 5. When the device 1 is in an inactive state in which the device 1 is incapable of capturing sound and/or rendering sound, each of the light rings 8, 9 is turned off and does not emit light to indicate the inactive state of the device 1.

Figure 8:
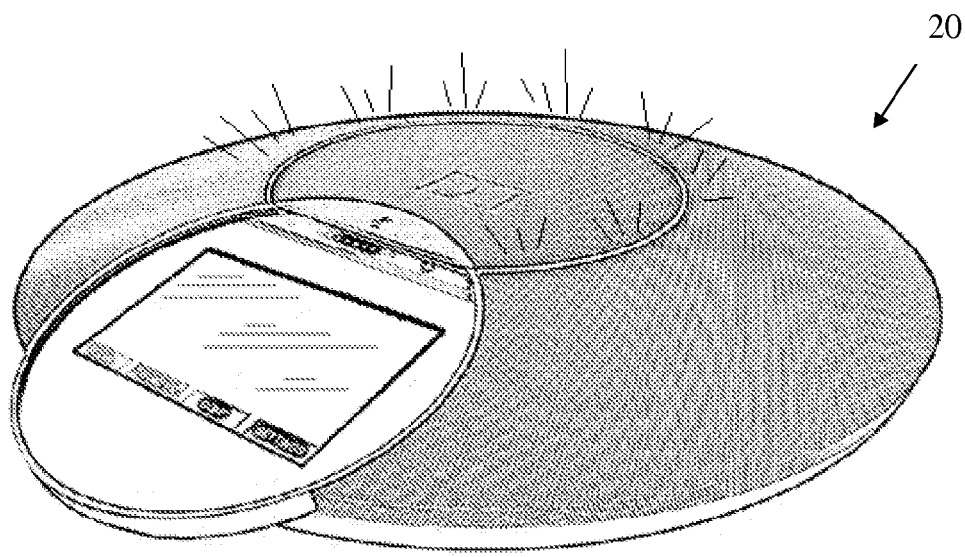
FIG. 8 is an isometric view of another telecommunications device according to the invention in an active state.

In FIG. 8 there is illustrated another telecommunications device 20 according to the invention, which is similar to the telecommunications device 1 of FIGS. 1 to 7, and similar elements in FIG. 8 are assigned the same reference numerals.

In this case the device 20 does not comprise a lower light ring.

FIG. 8 illustrates the telecommunications device 20 having the touch screen 7 with the top mounted light ring 9.

Figure 9:
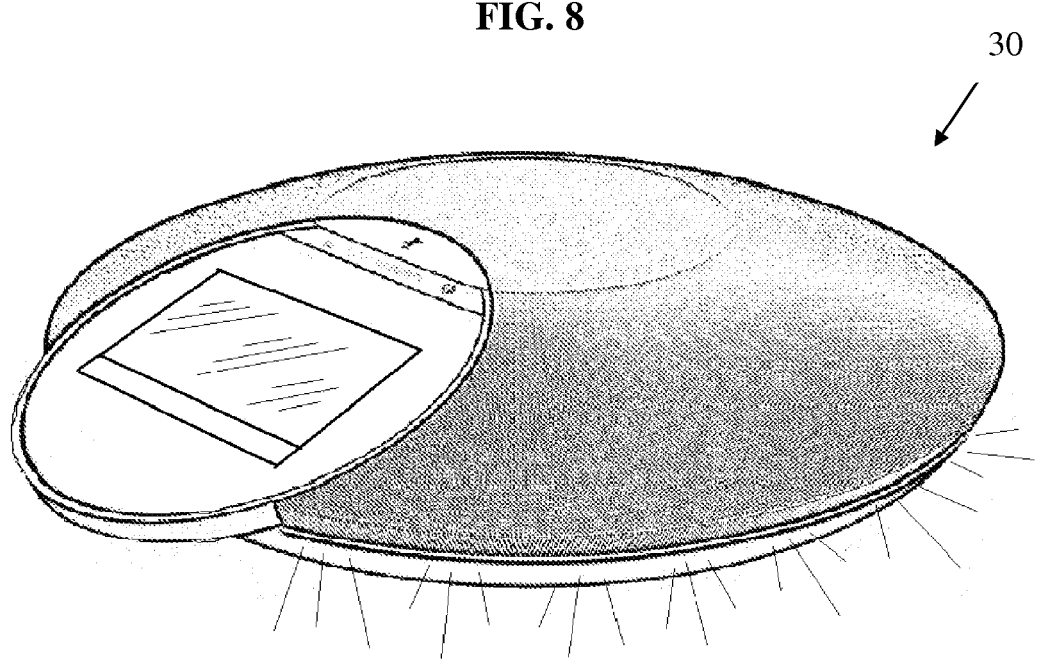
FIG. 9 is an isometric view of another telecommunications device according to the invention in an active state.

FIG. 9 illustrates a further telecommunications device 30 according to the invention, which is similar to the telecommunications device 1 of FIGS. 1 to 7, and similar elements in FIG. 9 are assigned the same reference numerals.

In this case the device 30 does not comprise an upper light ring.

FIG. 9 illustrates the telecommunications device 30 having the touch screen 7 with the bottom mounted light ring 8.

Figure 10:
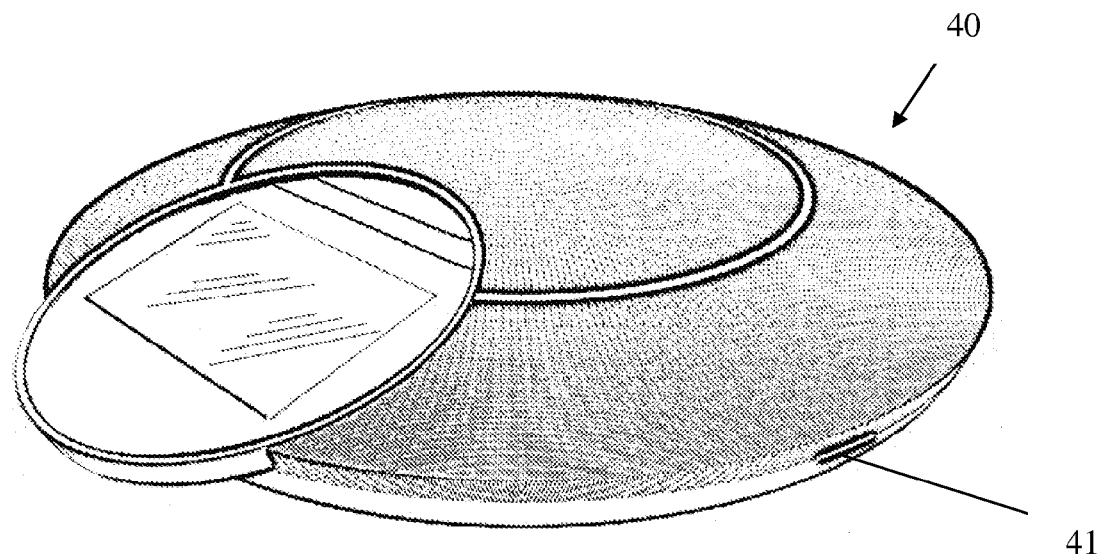
FIG. 10 is an isometric view of another telecommunications device according to the invention in an inactive state.
Figure 11:
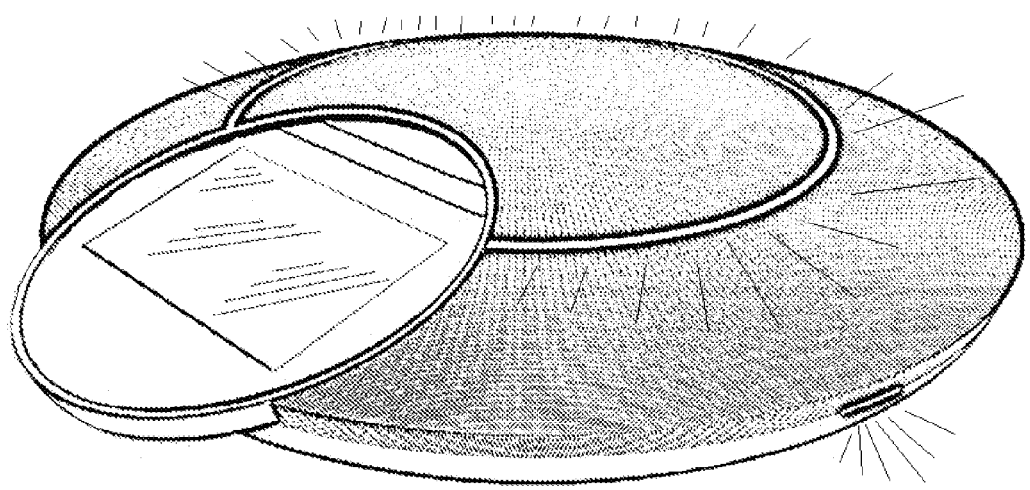
FIG. 11 is an isometric view of the telecommunications device of FIG. 10 in an active state.

Referring to FIGS. 10 and 11 there is illustrated another telecommunications device 40 according to the invention, which is similar to the telecommunications device 1 of FIGS. 1 to 7, and similar elements in FIGS. 10 and 11 are assigned the same reference numerals.

In this case the lower light element 41 has a compact form. The lower light ring 41 does not extend along the external surface of the device 1 in a curved ring shape.

FIG. 10 illustrates the telecommunications device 30 having the top mounted light ring 9 and status light 41 turned off. FIG. 11 illustrates the telecommunications device 30 having the top mounted light ring 9 and status light 41 activated.

In FIGS. 12 to 15 there is illustrated another telecommunications device 50 according to the invention, which is similar to the telecommunications device 20 of FIG. 8, and similar elements in FIGS. 12 to 15 are assigned the same reference numerals.

In this case the control panel 51 comprises a plurality of button elements 52 and a display element 53. The control panel 51 controls operation responsive to a user engaging the button elements 52 to depress the button elements 52. The display element 53 displays information to a user.

A volume rocker may be included on the button interface 51. A rocker switch may be used for other controls.

Figure 14:
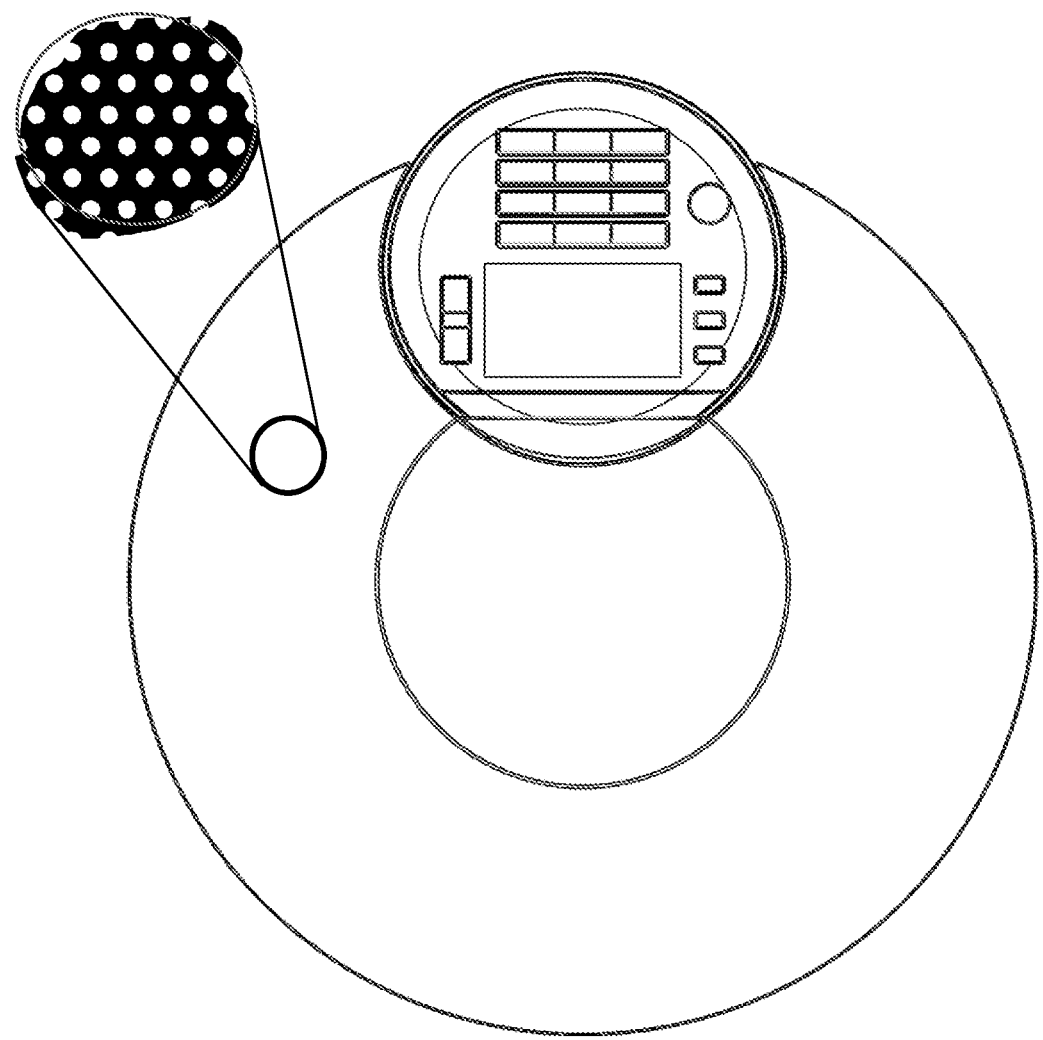
FIG. 14 is a plan view of the telecommunications device of FIG. 12 in the inactive state.
Figure 15:
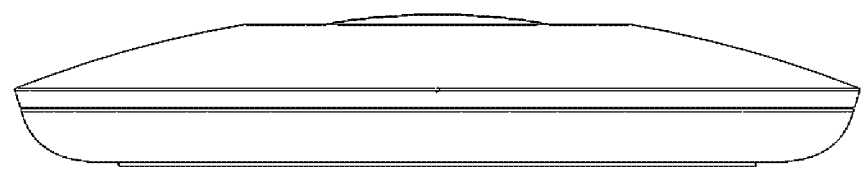
FIG. 15 is a rear view of the telecommunications device of FIG. 12 in the inactive state.

FIG. 12 illustrates the telecommunications device 50 having the dish top 4 with the light ring 9 turned off. FIG. 13 illustrates the telecommunications device 50 having the dish top 4 with the light ring 9 activated. FIG. 14 illustrates the telecommunications device 50 having the dish version 4. FIG. 15 illustrates the telecommunications device 50 having the dish version 4.

FIGS. 16 to 19 illustrate a further telecommunications device 60 according to the invention, which is similar to the telecommunications device 50 of FIGS. 12 to 15, and similar elements in FIGS. 16 to 19 are assigned the same reference numerals.

In this case the control panel 61 has an alternative layout of button elements 52.

It will be appreciated that the control panel may have any suitable layout of button elements 52 and/or display elements 53 and/or touchscreen elements 7 and/or any other suitable components to control operation responsive to a user input.

Figure 16:
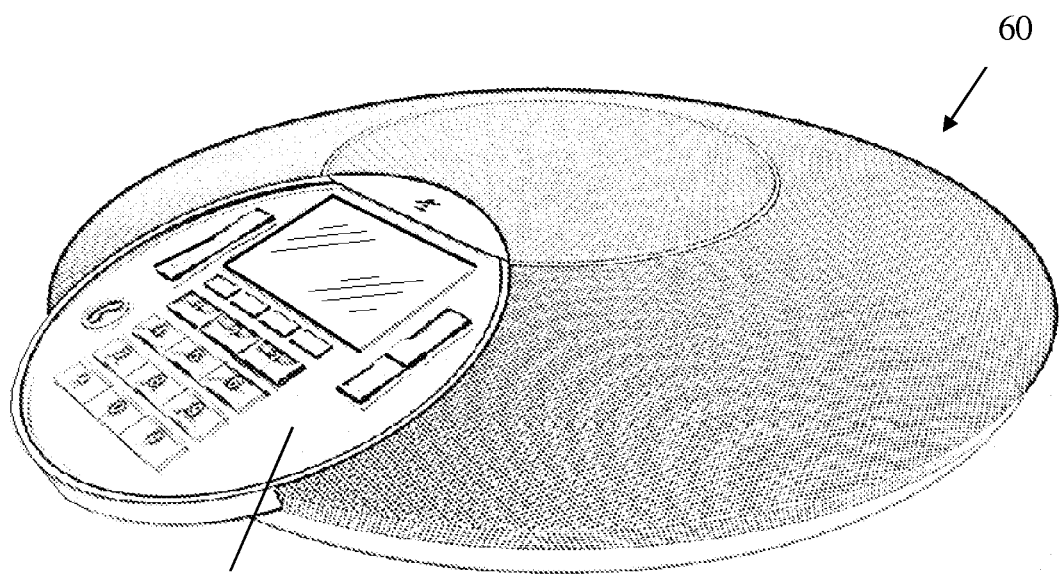
FIG. 16 is an isometric view of another telecommunications device according to the invention in an inactive state.
Figure 17:
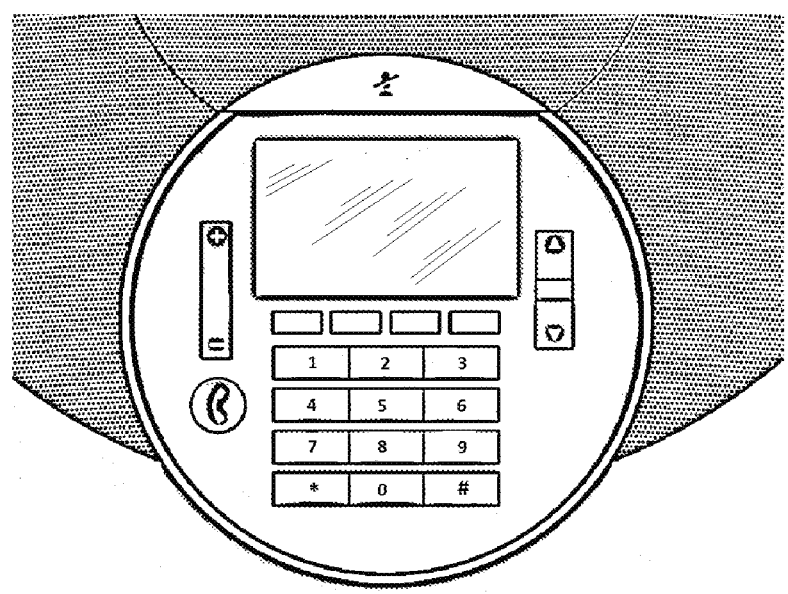
FIG. 17 is a plan view of part of the telecommunications device of FIG. 16 in the inactive state.
Figure 18:
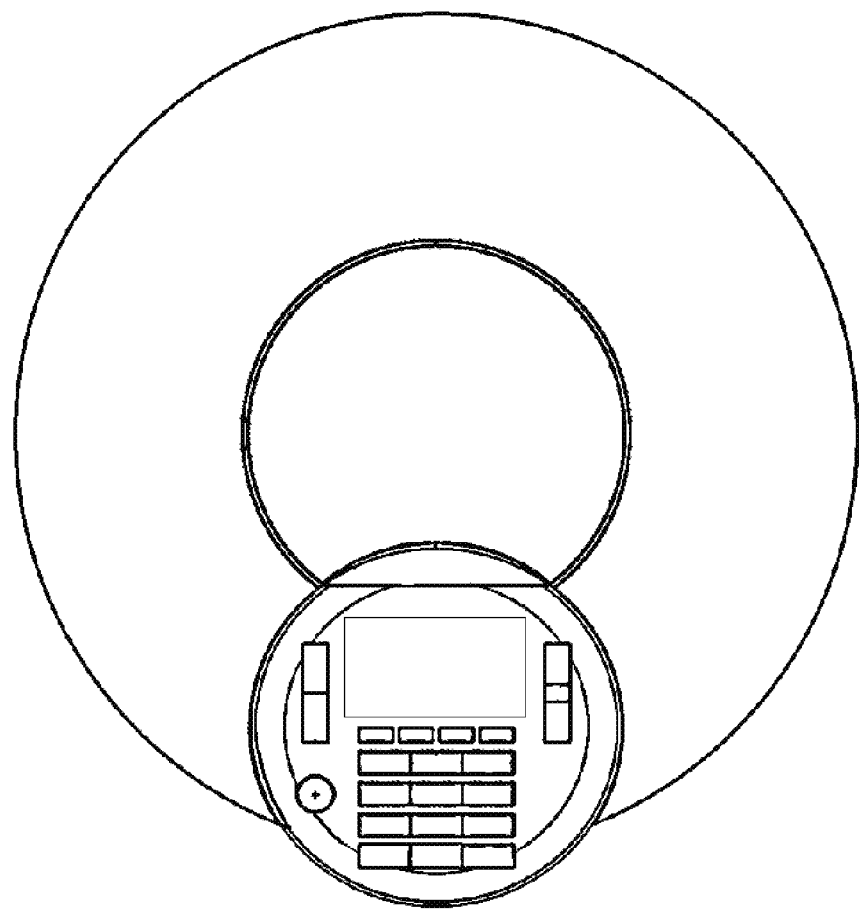
FIG. 18 is a plan view of the telecommunications device of FIG. 16 in the inactive state.
Figure 19:
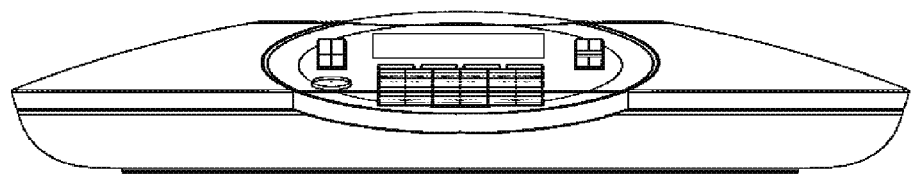
FIG. 19 is a front view of the telecommunications device of FIG. 16 in the inactive state.

FIG. 16 illustrates the telecommunications device 60 having the dish top 4 with the keypad 52. FIG. 17 illustrates the telecommunications device 60 having the keypad layout. FIG. 18 illustrates the telecommunications device 60 having the flat top with the keypad 52 and the light ring 9 on top. FIG. 19 illustrates the telecommunications device 60 having the flat top with the keypad 52 and the light ring 9 on top.

Figure 20:
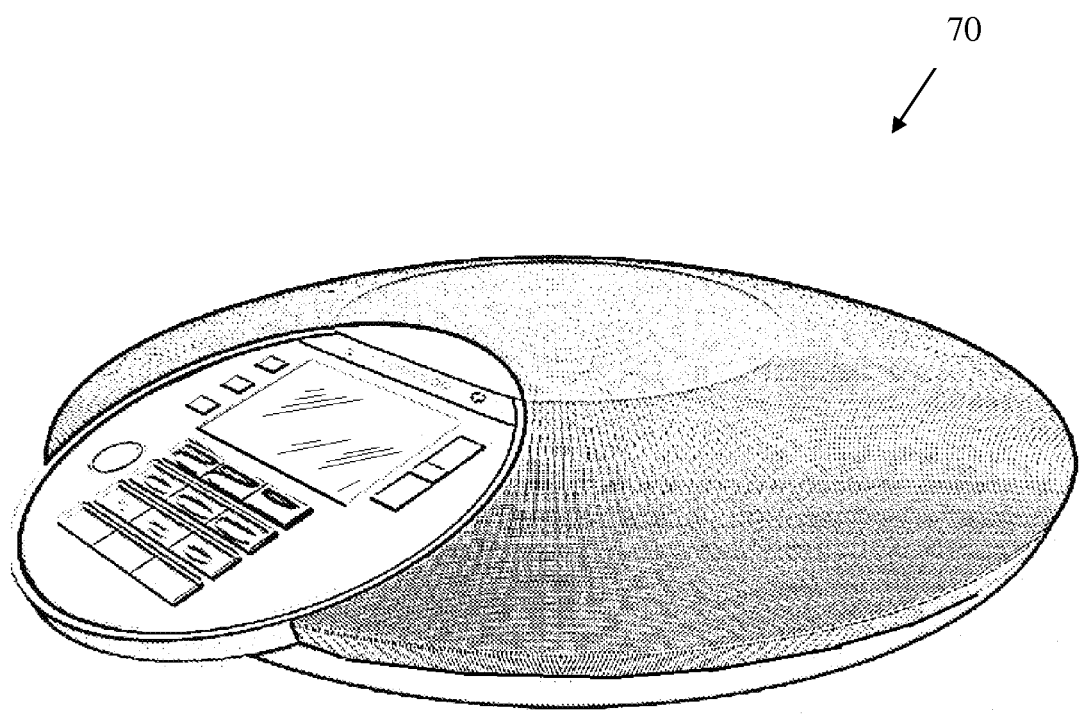
FIG. 20 is an isometric view of another telecommunications device according to the invention in an inactive state.

Referring to FIG. 20 there is illustrated another telecommunications device 70 according to the invention, which is similar to the telecommunications device 50 of FIGS. 12 to 15, and similar elements in FIG. 20 are assigned the same reference numerals.

In this case the body part 3 and the cap part 4 cover the upper light ring 9. The upper light rings 9 extends along part of the internal surface of the device 1 in a curved ring shape. The upper light rings 9 extends in a plane parallel to the plane of a support surface 6 and parallel to the plane of the base part 2. The upper light rings 9 comprises a tubular element.

When the device 1 is in the active state in which the device 1 is capable of capturing sound and/or rendering sound, the upper light ring 9 emits light to indicate the active state of the device 1. The apertures in the body part 3 and the cap part 4 facilitate light transmission therethrough to ensure that the light being emitted by the upper light ring 9 is visible to a user. When the device 1 is in the inactive state in which the device 1 is incapable of capturing sound and/or rendering sound, the upper light ring 9 is turned off and does not emit light to indicate the inactive state of the device 1. Because the body part 3 and the cap part 4 cover the upper light ring 9, the upper light ring 9 is not visible to a user.

FIG. 20 illustrates the telecommunications device 70 having the dish top 4 and the keypad 52 with the recessed light ring.

Figure 21:
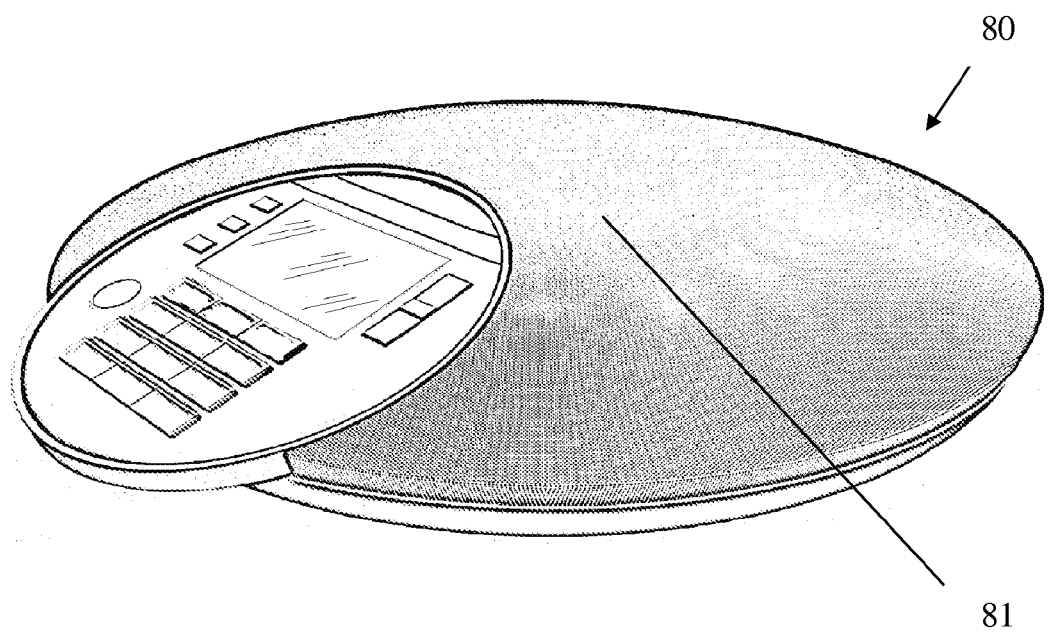
FIG. 21 is an isometric view of another telecommunications device according to the invention in an inactive state.
Figure 22:
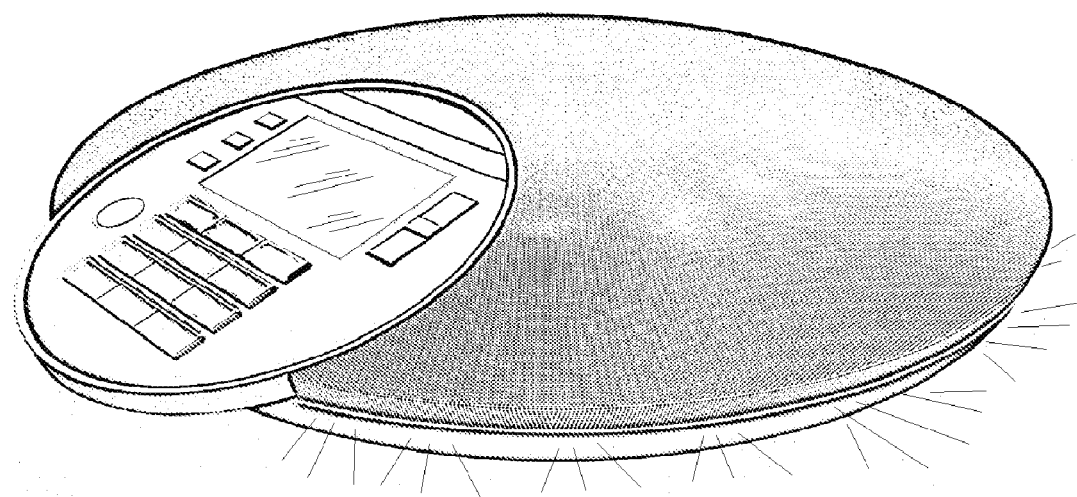
FIG. 22 is an isometric view of the telecommunications device of FIG. 21 in an active state.

In FIGS. 21 and 22 there is illustrated another telecommunications device 80 according to the invention, which is similar to the telecommunications device 50 of FIGS. 12 to 15, and similar elements in FIGS. 21 and 22 are assigned the same reference numerals.

In this case the device 80 comprises the lower light ring 8. The device 80 does not comprise an upper light ring.

The cap part 81 is convex in shape. As illustrated in FIG. 21, the dome part of the cap part 81 faces upwardly away from the support surface 6.

The control panel 51 comprises the plurality of button elements 52 and the display element 53. The control panel 51 controls operation responsive to a user engaging the button elements 52 to depress the button elements 52. The display element 53 displays information to a user.

FIG. 21 illustrates the telecommunications device 80 having the dome top 81 and the edge mounted light ring 8 turned off. FIG. 22 illustrates the telecommunications device 80 having the dome top 81 and the edge mounted light ring 8 activated.

Figure 23:
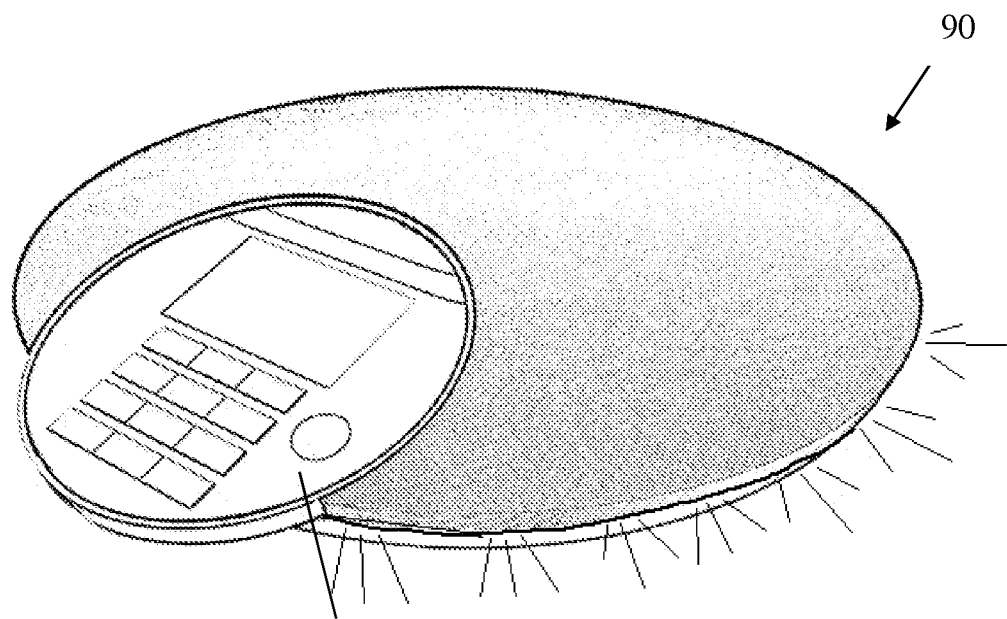
FIG. 23 is an isometric view of another telecommunications device according to the invention in an active state.

FIG. 23 illustrates a further telecommunications device 90 according to the invention, which is similar to the telecommunications device 80 of FIGS. 21 and 22, and similar elements in FIG. 23 are assigned the same reference numerals.

In this case the control panel 91 has an alternative layout of button elements 52.

FIG. 23 illustrates the telecommunications device 90 having the dome 81 and the keypad 52 with the bottom mounted light ring 8.

Figure 24:
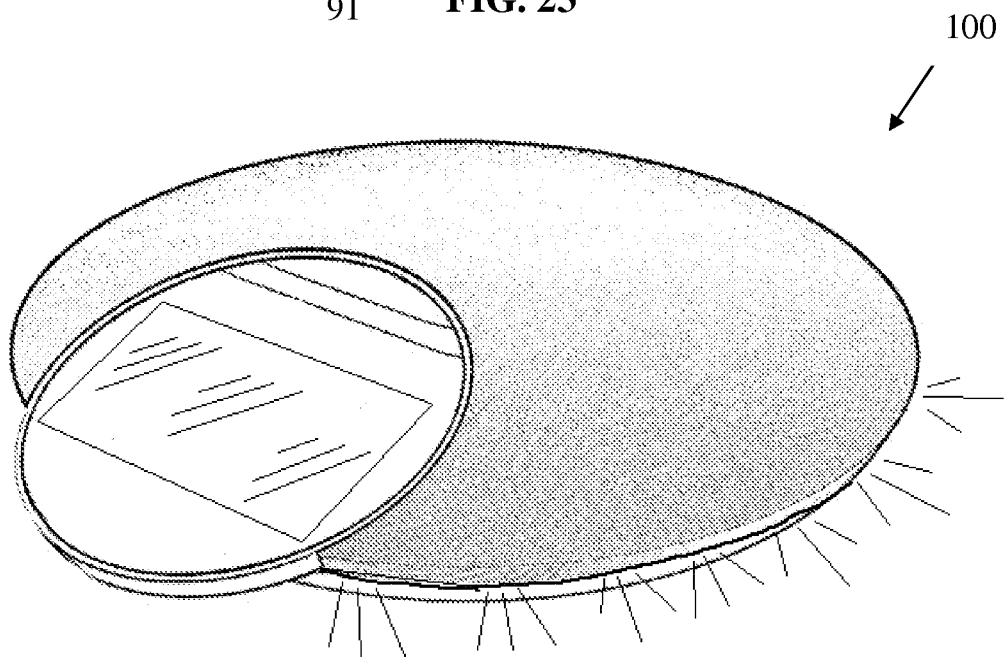
FIG. 24 is an isometric view of another telecommunications device according to the invention in an active state.

Referring to FIG. 24 there is illustrated another telecommunications device 100 according to the invention, which is similar to the telecommunications device 80 of FIGS. 21 and 22, and similar elements in FIG. 24 are assigned the same reference numerals.

In this case the control panel 5 comprises the touchscreen element 7 to control operation responsive to a user touching part of the touchscreen element 7. The touchscreen element 7 displays information to a user.

FIG. 24 illustrates the telecommunications device 100 having the dome 81 and the touchscreen 7 with the bottom mounted light ring 8.

Figure 25:
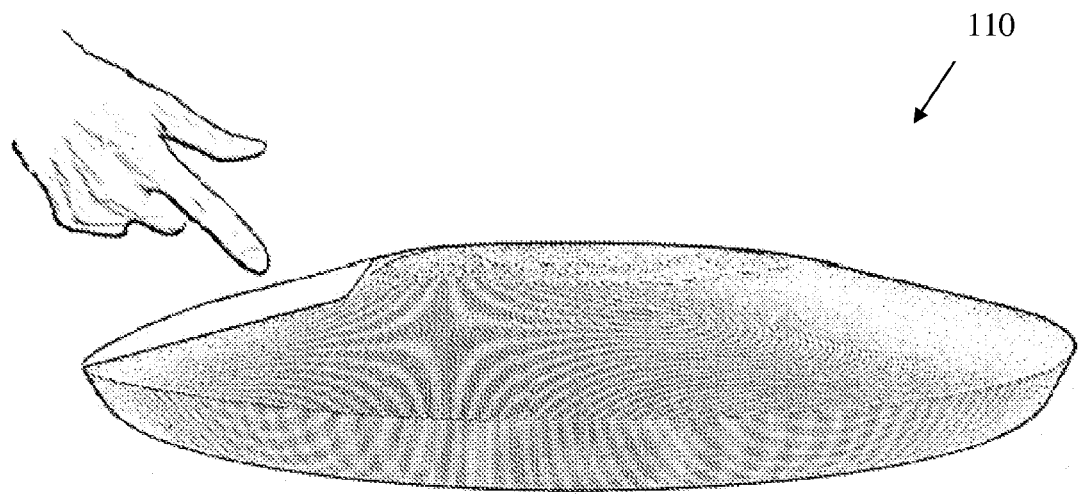
FIG. 25 is a side view of another telecommunications device according to the invention in an inactive state.
Figure 26:
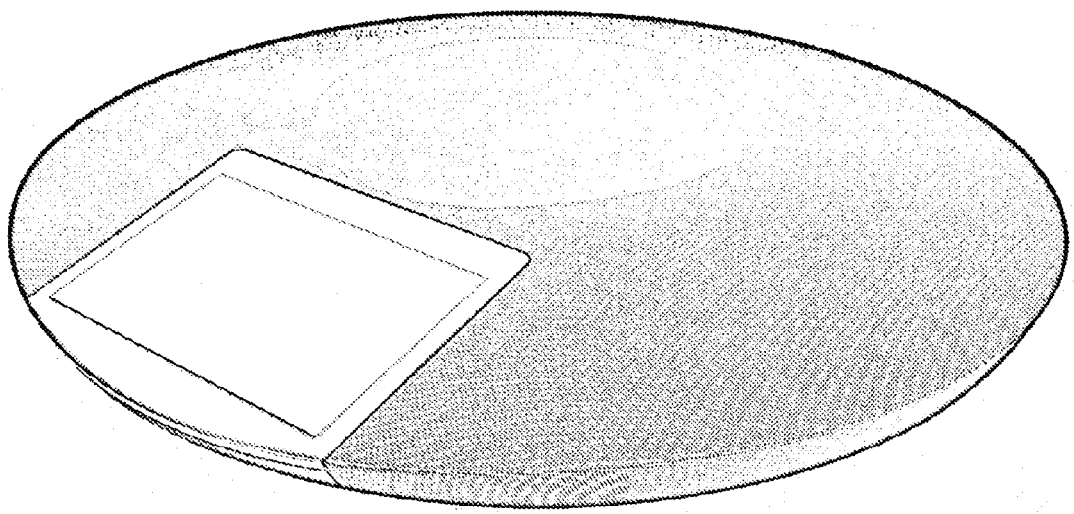
FIG. 26 is an isometric view of the telecommunications device of FIG. 25 in the inactive state.

In FIGS. 25 and 26 there is illustrated another telecommunications device 110 according to the invention, which is similar to the telecommunications device 100 of FIG. 24, and similar elements in FIGS. 25 and 26 are assigned the same reference numerals.

In this case the body part 3 and the cap part 4 cover the lower light ring 8 and the upper light ring 9. Each of the light rings 8, 9 extends along part of the internal surface of the device 110 in a curved ring shape. Each of the light rings 8, 9 extends in a plane parallel to the plane of the support surface 6 and parallel to the plane of the base part 2. Each of the light rings 8, 9 comprises a tubular element.

The cap part 81 is convex in shape. As illustrated in FIG. 25, the dome part of the cap part 81 faces upwardly away from the support surface 6.

The control panel 5 does not protrude upwardly from the upper edge of the body part 3, and the control panel 5 does not protrude downwardly from the lower edge of the body part 3. The control panel 5 is integrated with the dome.

FIG. 25 illustrates the telecommunications device 110 having the touch screen 7 with the fully enclosed metallic mesh 3 and the dish top 4. FIG. 26 illustrates the telecommunications device 110 having the touch screen 7 with the fully enclosed metallic mesh 3.

It will be appreciated that the control panel 5 may be movable relative to the body part 3. For example the control panel 5 may be slidable over the body part 3. Alternatively the mesh ring 3 around the device 1, which supports the control panel 5, may be on runners that allow the panel 5 to be rotated around the device 1. This allows the panel 5 to be slid around to face a user of the device 1. This may also rotate the spatial scene if the loudspeakers are also rotated underneath the mesh 3.

It will also be appreciated that a light ring may extend around the control panel 5. When the device is in an active state in which the device is capable of capturing sound and/or rendering sound, the light ring emits light to indicate the active state of the device. When the device is in an inactive state in which the device is incapable of capturing sound and/or rendering sound, the light ring is turned off and does not emit light to indicate the inactive state of the device.

It will further be appreciated that the lighting means to indicate the active state of the device may be provided in a variety of different manners. For example the light rings may be provided in the form of single multi-coloured LEDs around the device to indicate talk status, audio scene information, device status and the like. Alternatively precision lighting element may be used for the light guide. Alternatively a ring of light similar to a halo may be used to provide a continuous circle of information. The entire circle may be illuminated in the same colour, for example blue used for a spatial call, green used for a standard phone call, red used for muted indication, blue flashing when ringing and the like. Alternatively one ring of light may be placed around the top edge between the main side panel and the lip of the dish. Another ring of light may be placed around the bottom of the device. A third ring of light may be placed around the control pad. Each ring may be in different colours and communicate different information. They may be used simultaneously. For example a blue ring on top for a spatial call, with a blue pulsing ring underneath to communicate call quality, with a red flashing ring around the control pad to indicate when someone is requesting a private call.

The device may have a night time mode in which all the lights and the screen are dimmed or turned off completely. The display may be switched to white on black instead of black on white and the like. This may be useful not only at night time, but also in dark conference rooms where a projector is being used as part of the presentation. Having a very bright screen on the table with flashing, pulsing and different coloured light rings may act as a distraction. Turning off or dimming the brightness may be useful.

The lighting arrangement may be configured to indicate when the device is definitely off. For example if a user is having a meeting in a conference room, The lighting arrangement may have a specific colour, pattern, light configuration to indicate whether the device is turned on for example from a previous call or whether the device is turned off.

The invention is not limited to the embodiments hereinbefore described, with reference to the accompanying drawings, which may be varied in construction and detail.

What is claimed is:

1. A telecommunications device comprising:
    means to capture sound from one or more users, wherein the capturing means comprises a plurality of sound capturing elements, wherein an angle between a first sound capturing element and a second and adjacent sound capturing element is approximately 120 degrees and wherein the plurality of sound capturing elements comprises one or more sound microphones, and
    means to render sound to one or more users, wherein the rendering means comprises a plurality of sound rendering elements and wherein an angle between a first sound rendering element and a second and adjacent sound rendering element is approximately 120 degrees.

2. A device as claimed in claim 1 wherein the capturing means is configured to capture sound from one or more users spaced apart from the capturing means.

3. A device as claimed in claim 2 wherein the capturing means is configured to capture sound from one or more users spaced apart from the capturing means by at least 0.25 m.

4. A device as claimed in claim 1 wherein the rendering means is configured to render sound to one or more users spaced apart from the rendering means.

5. A device as claimed in claim 4 wherein the rendering means is configured to render sound to one or more users spaced apart from the rendering means by at least 0.25 m.

6. A device as claimed in claim 1 wherein the rendering means comprises one or more sound speakers.

7. A device as claimed in claim 1 wherein the device comprises means to control operation of the capturing means and/or of the rendering means.

8. A device as claimed in claim 7 wherein the control means comprises means to display information to a user.

9. A device as claimed in claim 8 wherein the display means comprises a screen element.

10. A device as claimed in claim 1 wherein the device comprises at least one of: an active state in which the device is capable of capturing sound and/or rendering sound; or an inactive state in which the device is incapable of capturing sound and/or rendering sound.

11. A device as claimed in claim 10 wherein the device comprises means to indicate the state of the device.

12. A device as claimed in claim 1 wherein an angle between each sound capturing element and each sound rendering element is approximately 60 degrees.

13. A device as claimed in claim 1, further comprising:
    lighting means to indicate the state of the device, wherein the lighting means includes at least one light ring.

14. A device as claimed in claim 13, wherein the lighting means includes means for illuminating at least one light ring in a first color for a standard phone call and illuminating at least one light ring in a second color for a spatial phone call.

15. A device as claimed in claim 13, wherein the lighting means includes means for indicating audio scene information.

16. A device as claimed in claim 13, wherein the lighting means includes means for indicating call quality.

17. A device as claimed in claim 13, wherein the lighting means includes means for indicating a request for a private call.

* * * * *